UNITED STATES PATENT OFFICE.

MAX WALLERSTEIN, OF NEW YORK, N. Y.

METHOD OF PREPARING CALCIUM SULFATE.

No. 879,603.    Specification of Letters Patent.    Patented Feb. 18, 1908.

Application filed June 21, 1907. Serial No. 380,160. (Specimens.)

*To all whom it may concern:*

Be it known that I, MAX WALLERSTEIN, a citizen of the United States, residing at 105 East Ninety-first street, New York city, in the county of New York and State of New York, have invented certain new and useful Improvements in Methods of Preparing Calcium Sulfate, of which the following is a specification.

The object of this invention is to prepare precipitated calcium sulfate in a form differing in certain physical respects from the usual or normal precipitate, and possessing advantages for certain purposes as hereinafter set forth.

With this object in view the invention comprises a method of preparing calcium sulfate and the product thereof.

When calcium sulfate is precipitated from aqueous solutions by the usual methods, as for instance by mixing a sufficiently concentrated solution of a calcium salt, as calcium chlorid, with a soluble normal or acid sulfate or with sulfuric acid, the calcium sulfate separates as an extremely finely-divided precipitate which appears under the microscope in the form of minute needle-like crystals. I have discovered however that by effecting the precipitation in the presence of small proportions of a colloidal substance capable of serving as a restraining or retarding agent the precipitate separates much more slowly and differs in character from the needle-like crystals above mentioned, appearing under the microscope in the form of plates or tablet-like crystals of relatively large size. These crystals are found to separate very readily from the mother-liquor under the ordinary conditions of filter-pressing, and to be easily washed and dried: they are found also to possess a high solution rate; the above characteristics rendering them particularly suitable for certain purposes, as for the preparation of brewing waters.

I may proceed substantially as follows: To a solution of a suitable calcium salt, as calcium chlorid, which may be of any desired strength but is preferably quite concentrated say ten to twenty per cent., I add a suitable colloidal substance, as gelatin, from one to five ounces of gelatin being preferably added to each thirty gallons of the solution, the proportion increasing with the concentration of the chlorid solution. There is then mixed with the chlorid solution in the proportion required to combine with the calcium therein, a solution of a suitable sulfate, as the normal or acid sulfate of sodium, or sulfuric acid, and the mixture is permitted to stand until precipitation is complete, the precipitation being accelerated by heating if desired.

The sulfate solution may be of any desired strength, ten per cent. being a convenient concentration.

In some cases I prefer to add the gelatin or equivalent colloidal substance both to the solution of the calcium salt and to that of the sulfate. In either case the calcium sulfate will be found to separate in the plate-like crystals above referred to, subsiding quickly in the solution and readily separable therefrom.

Instead of gelatin I may employ other albumenoid substances, these materials having been found to possess like gelatin the property of retarding the crystallization and determining the separation of the calcium in the form above described.

The calcium sulfate prepared as above may be utilized for the treatment of water for the preparation of beverages, being mixed if desired with other salts capable of accelerating its solution or modifying its action. It is also found to be adapted for the preparation of culture solutions for yeast and the like.

I claim:

1. The method of preparing calcium sulfate in plate-like crystals which consists in reacting upon a calcium salt in solution with a soluble sulfate in presence of a colloidal retarding agent.

2. The method of preparing calcium sulfate in plate-like crystals which consists in reacting upon a calcium salt in solution with a soluble sulfate in presence of gelatin.

In testimony whereof, I affix my signature in presence of two witnesses.

MAX WALLERSTEIN.

Witnesses:
CLINTON P. TOWNSEND,
CHARLES H. POTTER.